Oct. 1, 1957        E. B. NELSON        2,808,290
AUTOMOBILE REAR DECK PROTECTOR AND ARTICLE ENCLOSING DEVICE
Filed July 31, 1953
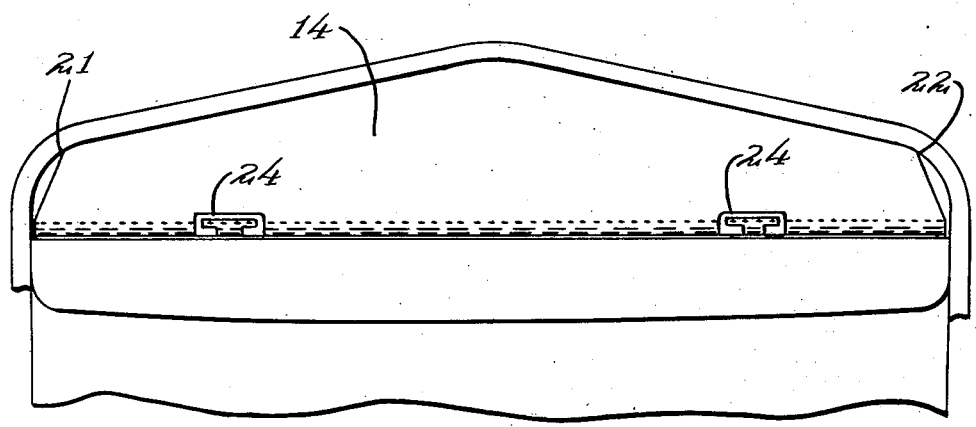
Fig. 1
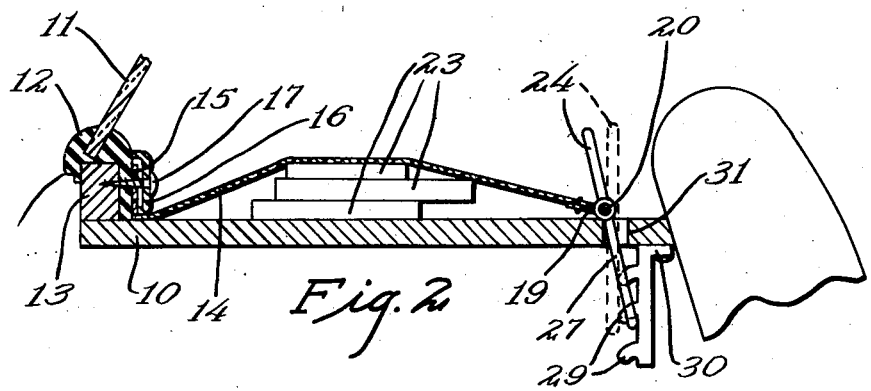
Fig. 2
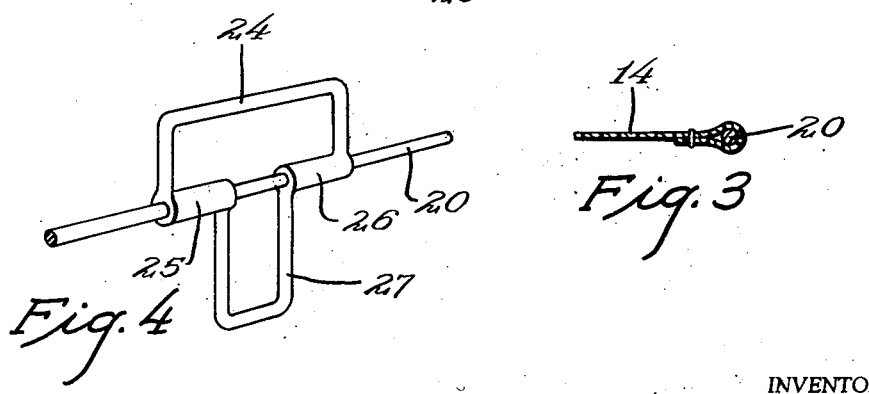
Fig. 3
Fig. 4
INVENTOR
*Ethel Bernice Nelson*
BY *Robert M. Dunning*
ATTORNEY

United States Patent Office 2,808,290
Patented Oct. 1, 1957

2,808,290

AUTOMOBILE REAR DECK PROTECTOR AND ARTICLE ENCLOSING DEVICE

Ethel Bernice Nelson, St. Paul, Minn.

Application July 31, 1953, Serial No. 371,460

7 Claims. (Cl. 296—37)

This invention relates to an improvement in automobile rear deck protection and deals particularly with a device for covering and enclosing articles placed upon the rear deck of an automobile.

In recent years automobiles have been constructed in which the rear windows extend most of the width of the car. These windows are usually rounded in form so as to provide a rear deck between the rear seat of the car and the window in case the car is provided with a rear seat and between the front seat of the car and the rear window in the event the car is provided with a single seat. Articles which are placed upon this rear deck are immediately visible to persons passing the car when the same is parked. This is particularly true as the cars presently constructed are relatively low and a clear view of the rear deck is visible to a person passing the car.

The present invention resides in the provision of a film of resilient material which is anchored marginally at its rear edge to that portion of the car immediately below the rear window or along the rear edge of the deck. This resilient film is capable of stretching sufficiently to overlie objects resting upon the rear deck and may be anchored along the front edge of the rear deck. As a result the objects on the rear deck may be normally covered by this film.

A feature of the present invention resides in the provision of a film which will stretch enough to extend over most objects on the rear deck and which will conceal these objects from view from the exterior of the car. As a result the beauty and the neatness of the car may be enhanced and the contents of the rear deck may be normally concealed from view.

A further feature of the present invention resides in the provision of a novel means of holding the cover stretched over the articles resting on the rear deck. It is desirable that the cover be readily operable so that little inconvenience is experienced in placing articles on the rear deck or removing such articles. The present device is designed to provide a minimum of inconvenience in this respect.

A feature of the present invention lies in the provision of a rear deck cover which retains the beauty of the car. The rear deck normally provides a "catch-all" and supports miscellaneous objects which cannot normally be easily seen from the interior of the car. From outside the car, however, these objects materially detract from the appearance of the car.

A further feature of the present invention lies in the fact that my rear deck cover makes a private storage space out of a deck which is normally exposed to the public. As a result, many objects may be carried or stored out of public view which would otherwise be concealed or carried in the car trunk.

An additional object of the present invention resides in the provision of a cover which may be useful in protecting items from sun, dust, wind, or moisture. As an example books, maps, or pamphlets placed upon the rear deck will be blown apart or blown away if the car windows are open. With my cover in place, this is not possible.

Still another feature of the present invention lies in the provision of a cover which acts to cut down theft of articles being carried. Many articles are stolen from cars because they are visible to passers-by. When a pedestrian sees a valuable item, such as a camera for example, within a car, he is tempted to steal the item. This temptation is eliminated when the objects are hidden from view.

It is also important to note that my cover makes possible the use of a space which is often not utilized because of the many disadvantages mentioned. In those cases, the cover makes possible the use of an otherwise waste space.

These and other objects and novel features of my invention will be more clearly and fully set forth in the following specification and claims.

In the drawings forming a part of the specification:

Figure 1 is a diagrammatical top view of the rear deck of an automobile showing the covering in place thereupon.

Figure 2 is a sectional view through the construction of Figure 1 showing the covering in place over the articles.

Figure 3 is a sectional view through the edge of the covering showing the manner in which the edge is reinforced.

Figure 4 is a perspective view of a fastening means which may be used to hold the covering in article covering position.

The device is shown only diagrammatically in view of the various constructions which may be employed. Each type of automobile has a rear window of various shape and contour and also usually is provided with a rear deck of different shape. For this reason the particular design and construction will vary according to the make of automobile. Furthermore, the shape of the rear window and the rear deck will vary according to the particular model of car on which the structure is employed.

With reference to Figure 1 of the drawings, this view shows a rear deck of generally triangular form and does not show the window structure which usually extends about the rear edge of the deck. Figure 2 shows in general a rear window for rear deck, the position of the section being at substantially the center of the rear window. Here again, however, the arrangement of the parts must be varied to suit the shape and construction of the particular vehicle involved and no attempt has been made to show the cross sectional construction of the joint between the body and the rear window as this arrangement also varies with various types of cars and models thereof. The specific arrangement is believed unimportant insofar as the detailed construction is concerned.

A rear deck is indicated in general by the numeral 10 and the rear window of the vehicle is indicated in general by the numeral 11. The window 11 is mounted in a suitable frame 12 which is shown as comprising an extrusion of rubber or similar material forming a molding. An upwardly extending frame member 13 is shown projecting upwardly from the rear deck 11 and normally at least partially concealed by the resilient molding 12. A sheet 14 of flexible and resilient material capable of stretching in all directions is shown including an anchoring flange 15 which extends upwardly along the inner edge of the molding 12. This flange 15 is anchored in place by a frame or molding 16 which is designed to clamp the flange 15 in place by means of suitable clamping screws 17. The molding or frame 16 is shaped to fit the contour of the rear deck 10 and to form an anchor for the rear edge of the covering sheet 14. In other words, the covering sheet 14 is anchored at its rear edge along the rear edge of the deck 10. The forward edge of the panel 14 is preferably doubled upon itself to form a hem 19. This hem is designed to enclose a reinforcing rod 20 which extends through the hem and is capable of stretching the forward end of the resilient panel 14 into proper position. In the particular form of construction illustrated the anchored portion of the rear edge of the panel 14 terminates at points 21 and 22 which are spaced from the hem 19. While this is not likely necessary it permits the forward edge of the resilient sheet to be flexed upwardly so that articles such as 23 may be more conveniently placed upon the rear deck 10. Various means may be provided for anchoring the forward edge of the sheet 14 in proper position. In the particular arrangement illustrated this means includes an inverted U shaped handle 24 secured to a single bearing or to aligned bearings 25 and 26. A U shaped anchoring member extends downwardly from the bearings 25 and 26 and is designed to engage on one of the rearwardly projecting tongues 29 on a bracket 30 mounted upon the underside of the deck 10. The provision of several hook shaped projections 29 permits the reinforcing rod to be variable in height to accommodate more or less of the articles 23 upon the rear deck. When the covering sheet 14 is stretched over the articles 23 the loops 27 are inserted to a desired extent through apertures 31 in the rear deck and the rear inforcing bar may be lowered to the extent necessary to properly cover the articles 23 without unduly stretching the material.

In accordance with the patent statues, I have described the principles of construction and operation of my automobile rear deck covering and while I have endeavored to set forth the best embodiment thereof, I desire to have it understood that obvious changes may be made within the scope of the following claims without departing from the spirit of my invention.

I claim:

1. A flexible rear deck covering for an automobile having a rear window and a rear deck inwardly of said window, the covering including a resilient panel sheet anchored along its rear edge adjoining the rear edge of said rear deck, a reinforcing member secured to the forward end of said panel and extending transversely thereof, handle means secured to said reinforcing member, and connecting means for detachably connecting said forward end of said resilient panel and said reinforcing member in proximity to the forward end of said rear deck.

2. The construction described in claim 1 and in which said detachable connection is adjustable in elevation.

3. The construction described in claim 1 and in which the connecting means extends through the rear deck.

4. The construction described in claim 1 and in which the detachable connection includes means extending downwardly from said reinforcement member and including cooperably engageable members for engaging said downwardly extending members.

5. A rear deck covering for use in combination with a vehicle body having a rear window, a seat having a back spaced forwardly from said window, and a deck extending between the seat back and the rear of the vehicle body beneath said rear window, a flexible and resilient sheet secured along one edge adjacent the juncture between the vehicle body and the rear edge of the deck beneath said rear window, and cooperable detachable fastening means on the forward edge of said sheet opposite said one edge and at the juncture between said seat back and the forward edge of said deck for detachably securing said sheet overlying said rear deck.

6. The structure of claim 5 and in which the said one edge of said sheet is curved to fit the curvature of the rear edge of said deck.

7. The structure of claim 5 and including a reinforcing means secured to the said opposite edge of said sheet.

References Cited in the file of this patent

UNITED STATES PATENTS

| | | |
|---|---|---|
| 1,715,308 | Richardson | May 28, 1929 |
| 1,946,633 | Meyer | Feb. 13, 1934 |
| 2,044,334 | Shrewsbury | June 16, 1936 |

FOREIGN PATENTS

| | | |
|---|---|---|
| 1,010,702 | France | Mar. 26, 1952 |
| 378,711 | Great Britain | Aug. 18, 1932 |